US012116301B2

(12) United States Patent
Niu et al.

(10) Patent No.: US 12,116,301 B2
(45) Date of Patent: Oct. 15, 2024

(54) CONSTRUCTING A MULTISTAGE FOOD CHAIN BIOFILM SYSTEM ENHANCED BY ELECTROCHEMISTRY AND ITS APPLICATION IN PHARMACEUTICAL WASTEWATER

(71) Applicant: North China Electric Power University, Beijing (CN)

(72) Inventors: Junfeng Niu, Beijing (CN); Mingchuan Yu, Beijing (CN)

(73) Assignee: NORTH CHINA ELECTRIC POWER UNIVERSITY, Beijing (CN)

( * ) Notice: Subject to any disclaimer, the term of this patent is extended or adjusted under 35 U.S.C. 154(b) by 0 days.

(21) Appl. No.: 18/678,934

(22) Filed: May 30, 2024

(65) Prior Publication Data

US 2024/0308896 A1    Sep. 19, 2024

(30) Foreign Application Priority Data

Nov. 20, 2023 (CN) .......................... 202311544334.0

(51) Int. Cl.
*C02F 103/34* (2006.01)
*C02F 9/00* (2023.01)

(52) U.S. Cl.
CPC .......... *C02F 9/00* (2013.01); *C02F 2103/343* (2013.01); *C02F 2201/46115* (2013.01); *C02F 2203/006* (2013.01)

(58) Field of Classification Search
CPC ............ C02F 1/46109; C02F 2103/343; C02F 2201/46105; C02F 2201/46; C02F 2203/006; C02F 2003/001; C02F 9/00
USPC ................................ 210/500.21, 600.27, 610
See application file for complete search history.

(56) References Cited

FOREIGN PATENT DOCUMENTS

CN            108727808 A  *  11/2018   ............. C08G 69/16

OTHER PUBLICATIONS

Zhang et al, English machine translation CN 108727808 A, pp. 1-12 (Year: 2018).*

* cited by examiner

*Primary Examiner* — Claire A Norris
(74) *Attorney, Agent, or Firm* — MUNCY, GEISSLER, OLDS & LOWE, P.C.

(57) ABSTRACT

The present invention belongs to the technical field of environmental engineering and provides a method for constructing a multistage food chain biofilm system enhanced by electrochemistry and an application in pharmaceutical wastewater. A flow-through electrochemical degradation module is constructed based on P/F-TiO$_{2-n}$ porous membrane electrodes, and a multistage flow-through composite electrochemical-biological submerged fixed film reactor is constructed jointly with the PA-N-rGO fixed fiber carrier and applied to deep purification of high-risk substances in pharmaceutical wastewater. The flow-through electrochemical degradation module can also effectively degrade antibiotics resistance genes and refractory organics in the water, improve the biodegradability of the wastewater and improve the degradation performance and load of shock resistance of the system, so the multistage flow-through composite electrochemical-biological submerged fixed film reactor can realize the high-efficiency low-consumption treatment of pharmaceutical wastewater and effectively reduce the yield of excess activated sludge.

6 Claims, 2 Drawing Sheets

(a)  (b)

CONSTRUCTING A MULTISTAGE FOOD CHAIN BIOFILM SYSTEM ENHANCED BY ELECTROCHEMISTRY AND ITS APPLICATION IN PHARMACEUTICAL WASTEWATER

TECHNICAL FIELD

The present invention belongs to the technical field of environmental engineering, and relates to a preparation method for a few-layer N-doped reduced graphene oxide nanosheet-doped nylon 66 fiber material and a P/F co-doped titanium suboxide (P/F-TiO$_{2-n}$) porous membrane electrode material, in particular to construction of a P/F-TiO$_{2-n}$ flow-through electrochemical degradation module and innovation of a method for forming a multistage food chain biofilm system in series with fiber materials as a microbial carrier to reduce the yield of excess activated sludge of the system.

BACKGROUND

With the growth of the population and the development of the medical system, the production and use of antibiotics around the world are increasing year by year, which also leads to the increasingly serious problem of pharmaceutical wastewater pollution. It is a major international need to reduce and even eliminate the potential risk posed by antibiotics, drug-resistant microorganisms and antibiotics resistance genes (ARGs) in pharmaceutical wastewater. High-efficiency low-consumption removal of high-risk low-concentration substances in pharmaceutical wastewater is one of the main bottleneck problems in the current field of water pollution control. Pharmaceutical wastewater generally contains a lot of high-risk substances such as antibiotics, drug-resistant microorganisms or ARGs, with high biotoxicity, which leads to the limited removal performance of traditional activated sludge processes for such wastewater and also produces a large number of ARGs, causing pollution to the discharge water body. In addition, the excess activated sludge produced in the process will become hazardous waste due to the existence of a large number of incompletely degraded and mineralized intermediate products therein, the treatment cost is increased, and the sludge treatment process is easy to cause secondary pollution to the water body and the atmosphere. Therefore, an effective method is needed to improve the ability of the activated sludge process to treat pharmaceutical wastewater, reduce the yield of excess activated sludge and remove the ARGs from the water.

As an advanced oxidation process, electrocatalytic oxidation can produce electrons or reactive oxygen species under the action of an electric field, thus realizing effective decomposition of pollutants in wastewater through direct or indirect reactions. The process has the advantages of strong degradation performance for organic pollutants, mild and controllable operating conditions and high degree of automation. According to the characteristics of pharmaceutical wastewater, the substances that are difficult to biodegrade in wastewater can be pre-treated through an advanced oxidation process in combination with an electrooxidation-microbial compound process to improve the biodegradability of the wastewater, so as to further degrade organics in the wastewater with high efficiency and low consumption in combination with the microbial degradation process. In view of the characteristics of the high-risk low-concentration substances, it is still important and difficult for treatment of pharmaceutical wastewater to design appropriate functional materials, develop efficient treatment processes and elaborate removal mechanisms.

In current researches, with regard to the electrooxidation-microbial compound process, electrodes are generally placed directly in a microbial reactor to activate microbial communities or promote the degradation of pollutants by a weak current on the electrode surfaces, for example, in the paper "Implemented impediment of extracellular electron transfer dependent anammox process: Unstable nitrogen removal efficiency and decreased abundance of anammox bacteria", the constructed compound system cannot make the electrochemical unit operate at a high current density due to a short distance between the microorganisms and the electrodes, so the main function of the electrochemical unit of the compound system is to promote the growth and proliferation of the microorganisms. The electrochemical unit has a weak effect on the degradation of pollutants, and the advantages of the two processes cannot be fully utilized in the compound system.

The present invention introduces F and P atoms into the titanium suboxide structure to form a P/F co-doped titanium suboxide (P/F-TiO$_{2-n}$) porous membrane electrode material, the F atoms are used to improve the hydrophobicity of the material, and the P atoms are used to adjust local charge distribution of the active site Ti$^{3+}$, improve the catalytic stability and catalytic activity and construct an electrochemical degradation module. Meanwhile, with nylon 66 (PA66) fibers as the substrate of the microbial carrier, few-layer N-doped reduced graphene oxide (N-rGO) nanosheets and PA66 are blended to form a PA-N-rGO fiber material, and the N-rGO nanosheets uniformly dispersed can effectively increase the specific surface area, electric conductivity and mechanical properties of the fibers. In addition, the existence of a large number of electron-deficient pyridine nitrogen structures in the N-rGO structure can further enhance electron directed migration in the system and promote the proliferation and metabolic processes of the microorganisms. A flow-through electrochemical degradation module based on P/F-TiO$_{2-n}$ porous membrane electrodes and a multistage biofilm reactor unit are reasonably connected in series to serve as a separation structure to be put in a biofilm reactor with a PA-N-rGO fixed fiber carrier, forming a multistage biofilm reactor unit, which can make zoogloea, protozoa, metazoa and aquatic animals enriched in a stepped manner to form stepped biological chains and food chains, and the excess activated sludge scattered in the water is gradually preyed and consumed by the food chains during the process of step-by-step penetration of wastewater, finally achieving the purpose of significantly reducing the yield of excess activated sludge. During the process, the flow-through electrochemical degradation module can also effectively degrade the ARGs and refractory organics in the water, improve the biodegradability of the wastewater, improve the degradation performance and load of shock resistance of the system and avoid the problem of weak electrochemical degradation ability in the traditional electrooxidation-microbial compound process, so the multistage flow-through composite electrochemical-biological sub-merged fixed film reactor can realize the high-efficiency low-consumption treatment of pharmaceutical wastewater.

SUMMARY

The present invention provides a preparation method for a P/F co-doped titanium suboxide (P/F-TiO$_{2-n}$) porous membrane electrode material and a few-layer N-doped reduced graphene oxide nanosheet-doped nylon 66 fiber (PA-N-rGO) microbial carrier. A flow-through electrochemical degradation module is constructed based on P/F-TiO$_{2-n}$ porous membrane electrodes to serve as a separation structure to be put in a biofilm reactor with a PA-N-rGO fixed fiber carrier, forming a multistage biofilm reactor unit, a multistage flow-through composite electrochemical-biological submerged fixed film reactor is constructed, which can be applied in high-efficiency low-consumption treatment processes of refractory organic wastewater such as pharmaceutical wastewater, and the system has high degradation performance and load of shock resistance. Meanwhile, since zoogloea, protozoa, metazoa and aquatic animals are enriched in a stepped manner, and the excess activated sludge scattered in the water is gradually preyed and consumed by the food chains during the process of wastewater penetrating the biofilm reactor unit step by step, finally achieving the purpose of significantly reducing the yield of excess activated sludge.

The technical solution of the present invention is as follows:

A method for constructing a multistage food chain biofilm system enhanced by electrochemistry, comprising the following steps:

Step 1: preparing a nylon 66 (PA66) material by a method in the article "The synthesis of oligomers related to nylon 4 6 and nylon 6 6".

Step 2: preparing a reduced graphene oxide (N-rGO) material by a method in the article "Free-Standing 3D Porous N-Doped Graphene Aerogel Supported Platinum Nanocluster for Efficient Hydrogen Production from Ammonia Electrolysis".

Step 3: putting the N-rGO material obtained in step 2 into a ball mill, treating the N-rGO material by dry ball milling at a revolving speed of 3000-5000 rpm for 30-60 min, taking out the N-rGO material for ultrasonic dispersion with deionized water (for 10 min), conducting suction filtration of the dispersion liquid, taking out black filtrate, and carrying out freeze drying to obtain a few-layer N-rGO nanosheet material. Heating the PA66 material obtained in step 1 to 230-280° C., adding the few-layer N-rGO nanosheet material in a molten state at a mass ratio of 7:3-99:1, conducting stirring for 30 min in the molten state, forming PA-N-rGO fibers by an extruder, and fixing both ends of the PA-N-rGO fibers on a frame composed of polypropylene pipes by a textile machine to form a plurality of fixed fiber curtains composed of the PA-N-rGO fibers to be used as fixed fiber curtain carriers for carrying microorganisms, wherein the length range of the PA-N-rGO fibers is 50-2000 mm.

Step 4: pre-treating porous Ti plates by heating in potassium hydroxide and oxalic acid solutions successively, removing impurities from the surfaces, and forming titanium oxide films in situ on the surfaces of the porous Ti plates by an electrochemical etching method in the article "Removal of aqueous triclosan using TiO$_2$ nanotube arrays reactive membrane by sequential adsorption and electrochemical degradation"; and then, conducting repeated dip-coating on the oxidized porous Ti plates in a 0.5-3 mol/L potassium fluoride aqueous solution for 3-20 times, and loading potassium fluoride on the surfaces of the Ti plates. Putting the Ti plates into a corundum porcelain boat and then into a tube furnace, placing the porcelain boat with sodium hypophosphite (0.5-10 g) at a distance of 100 mm from the porous Ti plates upwind of the tube furnace, carrying out gradient heating in a nitrogen atmosphere at a heating rate of 5° C./min, conducting isothermal reactions for 1-2 h respectively at temperatures of 350° C. and 450° C., carrying out natural cooling to room temperature, and finally performing electrochemical reduction treatment of the porous Ti plates, thus obtaining the P/F co-doped titanium suboxide (P/F-TiO$_{2-n}$) porous membrane electrode material.

Step 5: constructing a flow-through electrochemical degradation module with anodes made of the obtained P/F co-doped titanium suboxide (P/F-TiO$_{2-n}$) porous membrane electrode material and cathodes made of 4-30-mesh stainless steel meshes, wherein the cathodes and the anodes are spaced 10-30 mm apart; putting the fixed fiber curtain carriers obtained in step 3 into a microbial reactor, with the fixed fiber curtains spaced 200-500 mm apart, so as to form a biological submerged fixed film reactor; and dividing the biological submerged fixed film reactor into 3-12 cells by the flow-through electrochemical degradation module to construct a multistage flow-through composite electrochemical-biological submerged fixed film reactor, applying a constant current of 0.5-5 mA/cm$^2$ for operation, and adding activated sludge to the microbial reactor for culture, which enables the fiber surfaces to carry a large number of functional microorganisms in a short time.

The multistage flow-through composite electrochemical-biological submerged fixed film reactor is suitable for an aerobic process, an anaerobic process, an anaerobic-aerobic process and an anaerobic-anoxic-aerobic process. Meanwhile, since the multistage flow-through composite electrochemical-biological submerged fixed film reactor is divided by the flow-through electrochemical degradation module into multistage biofilm reactor units which are connected in series, the level of organisms growing in the biofilm reactor units connected in series from front to back is gradually increased. A large number of protists and metazoa will appear in a posterior biofilm reactor unit, forming a food chain, i.e., higher organisms that feed on the organisms in the unit of the previous stage will appear in the organisms in the biofilm reactor unit of the latter stage, so as to reduce the excess activated sludge produced by microorganisms.

With domestic wastewater as a treatment objective, the excess activated sludge produced by the multistage flow-through composite electrochemical-biological submerged fixed film reactor is only 1-10% of that produced by traditional biofilm reactors; and with pharmaceutical wastewater as a treatment objective, the excess activated sludge produced by the multistage flow-through composite electrochemical-biological submerged fixed film reactor is only 15-30% of that produced by traditional biofilm reactors. Moreover, in the case of the same operation conditions and culture time, the removal rates of refractory organics (antibiotics, analgesics and antidepressants) and COD in pharmaceutical wastewater (COD: 1500-2500 mg/L) are 99% and 95% (<50 mg/L) respectively under power-on conditions, which are 1.9 times and ¼ of those under power-off conditions.

The present invention has the following beneficial effects: the functional PA-N-rGO fiber material prepared by the method of the present invention can be used as a microbial carrier, the preparation method by freeze drying-melt mixing in step 3 is simple and suitable for industrial production, and N-rGO can form a large number of nanosheet structures on the surface of PA, which can effectively increase the specific surface area of the material; meanwhile, the excellent electrical conductivity can enhance electron transfer between the carried microorganisms and promote the proliferation process of the microorganisms; and the existence of a large number of electron-deficient pyridine nitrogen structures in the N-rGO structure can further enhance electron directed migration in the system and enhance the syntrophic metabolism of the microorganisms. In addition, doping N-rGO in PA can significantly improve the mechanical strength and the aspect ratio of fibers, increase the service life and biological load capacity of the fibers and reduce the replacement frequency and use cost. Aiming at the problems of low electron utilization rate, low pollutant decomposition efficiency and high energy consumption caused by the limited interphase mass transfer rate of pollutants of traditional plate electrodes, the present patent combines the advantages of membrane filtration and electrochemical oxidation to construct a flow-through electrochemical degradation module. In step 4, with potassium fluoride and sodium hypophosphite as F/P-doped precursors, F and P are doped into a titanium suboxide lattice structure by a simple method of gradient calcination to regulate the coordination structure of Ti, and the proximity effect formed by constructing heterogeneous interface structures and the hydrophobic effect of F doping can enhance the ability of the system to adsorb organic pollutants; and the electronegativity of P atoms is weaker than that of O atoms, and the introduction of the P atoms into the lattice structure can regulate the localized electronic structure of an active site $Ti^{3+}$ in the system, inhibit the transformation thereof to the hypervalent state ($Ti^{4+}$) in the catalytic process and maintain the stability and catalytic activity of the catalytic site. In addition, the collaboration between the heterogeneous structure and the defect structure in the $P/F-TiO_{2-n}$ structure can further strengthen the production of reactive oxygen species ($\cdot OH$ and $^1O2$) in the electrocatalytic process, which is conducive to the degradation and mineralization of organic pollutants and improves the biodegradability of pharmaceutical wastewater. The flow-through electrochemical degradation module is constructed using $P/F-TiO_{2-n}$ electrodes prepared in step 4 and placed in different positions in a pool where the PA-N-rGO fiber curtain packing is fixed, and the biofilm reactor is divided, which can make zoogloea, protozoa, metazoa and aquatic animals enriched in a stepped manner to form favorable stepped combination of biological chains and food chains, finally achieving the purpose of significantly reducing the yield of excess activated sludge. The stable microbial load and food chain system can effectively increase the load of shock resistance of the biological submerged fixed film reactor and improve the operation stability of the system. In addition, the multistage flow-through electrochemical degradation module can also perform electrochemical treatment on the biofilm treated wastewater at the previous stage, further improve the biodegradability of the wastewater, reduce the biotoxicity and remove the residual ARGs from the water, which is conducive to improving the biofilm treatment effect and system stability of the next stage.

Figure 1:
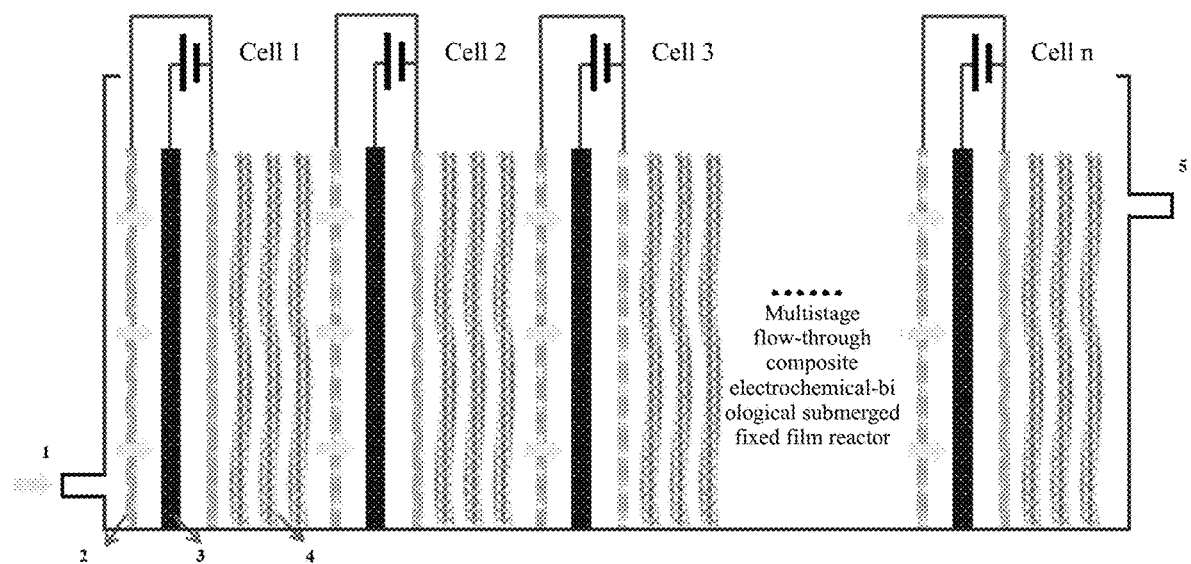
FIG. 1 is a main view of a multistage flow-through composite electrochemical-biological submerged fixed film reactor.
Figure 2:
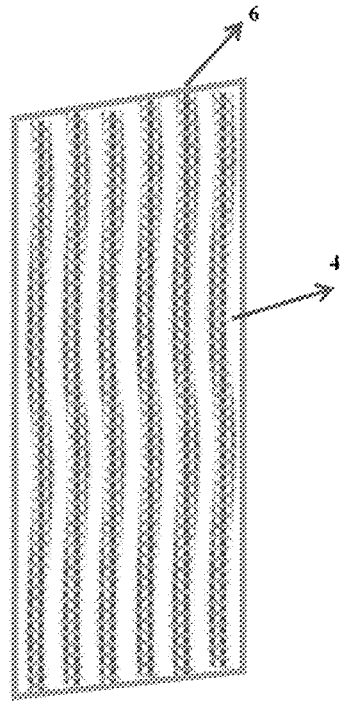
FIG. 2 is a structural diagram of a fixed fiber curtain carrier.
Figure 3:
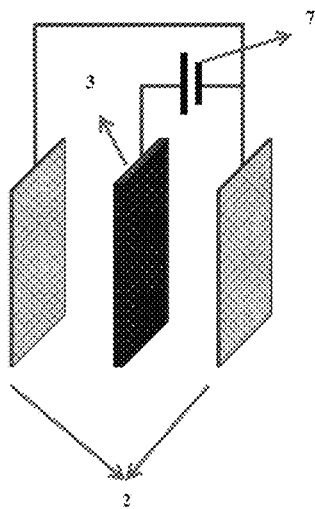
FIG. 3 is a structural diagram of a flow-through electrochemical degradation module.
Figure 4:
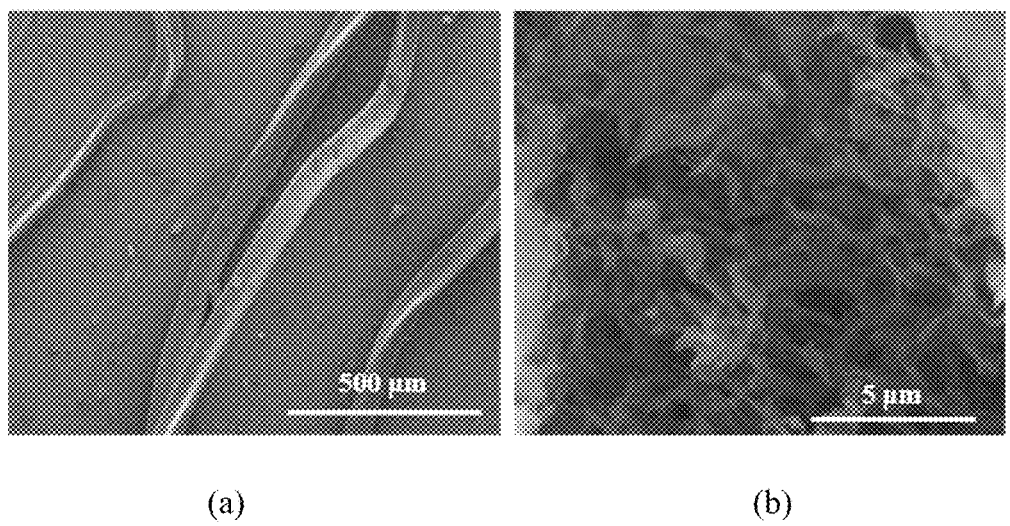
FIG. 4 shows scanning electron microscope diagrams of PA-N-rGO1, (a) scanning electron microscope diagram at 500 μm and (b) scanning electron microscope diagram at 5 μm.
Figure 5:
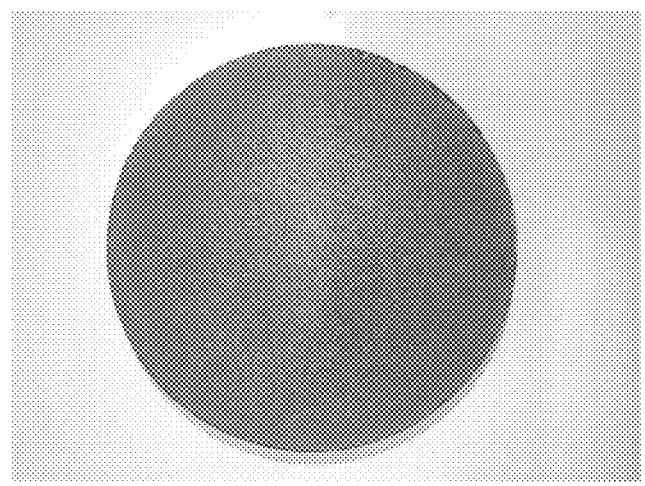
FIG. 5 shows a sample of a $P2/F1-TiO_{2-n}$ electrode material.

In the figures: 1 water inlet, 2 stainless steel mesh cathode, 3 $P/F-TiO_{2-n}$ porous anode, 4 PA-N-rGO fixed fiber curtain, 5 water outlet, 6 fixed outer frame, and 7 DC power supply.

DETAILED DESCRIPTION

Specific embodiments of the present invention are further described below in combination with the technical solution.

Embodiment 1

Preparation of N-rGO Material:
Referring to the method in the article "Free-Standing 3D Porous N-Doped Graphene Aerogel Supported Platinum Nanocluster for Efficient Hydrogen Production from Ammonia Electrolysis", the specific steps are as follows: graphite powder is pre-oxidized first, 5 g of natural graphite powder, 2.5 g of potassium persulfate and 2.5 g of phosphorus pentoxide are weighed and added into a round-bottom flask, 10 mL of concentrated sulfuric acid is added for stirring action in a 80° C. thermostat water bath for 8 h to form viscous pre-oxidized graphite, and then the graphite is oxidized. In an ice bath, 2.5 g of sodium nitrate and 150 mL of concentrated sulfuric acid are added, and 15 g of potassium permanganate is slowly added (the mass ratio of graphite powder to potassium permanganate is 1:3). During the process, the reaction temperature should not exceed 20° C. After stirring reaction for 1 h, the temperature of the water bath is adjusted to 35° C., the stirring reaction is continued for 2 h, the pre-oxidized graphite is further oxidized by the potassium permanganate, 230 mL of deionized water is added, the temperature of the water bath is increased to 98° C., and then the stirring reaction is continued for 2 h. Finally, the heating in the water bath is stopped, 250 mL of deionized water and 20 mL of hydrogen peroxide solution are added, stirring reaction is conducted for 1 h, and then the reaction is stopped. The brown yellow reaction liquid is poured into the flask, repeatedly washed with 0.1 M hydrochloric acid and tested with a 2 wt % $BaCl_2$ solution until the $SO_4^{2-}$ in the solution is clean, and the solution is washed with deionized water until pH is near neutral (pH≈6-7). After ultrasonic treatment, uniform and stable GO suspension is obtained.

For the N doping process, after 3 mg mL$^{-1}$ GO solution (40 mL) is ultrasonically mixed with melamine of different qualities, the mixtures are added into a 50 mL reactor respectively, sealed and then subjected to hydrothermal synthesis at 180° C. for 12 h, the obtained solid is cleaned with deionized water, dried and calcined in a tube furnace at 550° C. in an argon atmosphere for 4 h, and the obtained black powder is the prepared N-rGO.

Embodiment 2

Preparation of Fixed Fiber Curtain Carrier:
A PA66 material is prepared according to the reference in step 1, the N-rGO solid material in embodiment 1 is put into a ball mill and treated by dry ball milling at a revolving speed of 3000-5000 rpm for 30-60 min, the N-rGO material is taken out for ultrasonic dispersion with deionized water (for 10 min), the dispersion liquid is subjected to suction filtration, black filtrate is taken out, and freeze drying is carried out to obtain a few-layer N-rGO nanosheet material. The PA66 material is heated to 280° C. and added with the few-layer N-rGO nanosheet material in a molten state at a mass ratio of 9:1, which are stirred in the molten state for 30 min, PA-N-rGO1 fibers are formed by an extruder, and the PA-N-rGO1 fibers are fixed on a frame composed of polypropylene pipes by a textile machine to form a fixed fiber curtain carrier for carrying microorganisms.

Reference group: different PA-N-rGO fibers are prepared by the same preparation method at different N-rGO nanosheet addition proportions, the mass ratio of PA66 to N-rGO nanosheets is 7:3, 8:2, 95:5, 99:1 and 10:0 respectively, the fibers are numbered PA-N-rGO3, PA-N-rGO2, PA-N-rGO0.5, PA-N-rGO0.1 and PA-N-rGO0 respectively, and the corresponding fixed fiber curtain carrier is prepared by the textile machine.

Embodiment 3

Physical and Chemical Property Test of PA-N-rGO Fibers:

The specific surface areas of PA-N-rGO3, PA-N-rGO2, PA-N-rGO1, PA-N-rGO0.5, PA-N-rGO0.1 and PA-N-rGO0 are tested by N2 adsorption and desorption experiments, which are 14.1, 19.9, 25.6, 15, 8.6 and 2.7 $m^2/g$ respectively. With the appearance of a large number of two-dimensional lamellar structures on the surfaces of N-RGo-doped PA-N-rGO fibers, the specific surface area is gradually increased, which is conducive to the enrichment of microorganisms on the surface of the materials and the electron transfer between microorganisms. When the addition amount of N-rGO is too high, the specific surface area of the material is decreased, which is because too much N-rGO cannot be completely uniformly dispersed in the system, and aggregates with each other due to $\pi$-$\pi$ stacking, thus reducing the specific surface area of the material.

The resistances of PA-N-rGO3, PA-N-rGO2, PA-N-rGO1, PA-N-rGO0.5 and PA-N-rGO0.1 are tested by a four-probe method, which are 161, 57, 13, 195 and 940$\Omega$ respectively, and the non-conductivity of PA-N-rGO0 cannot be tested. The electrical conductivity of the N-rGO-doped PA-N-rGO fibers first increases and then decreases, which is also because the excessive N-rGO will aggregate and thus affect the electrical conductivity of the system. An appropriate addition amount of N-rGO can achieve optimal electrical conductivity, so as to promote electron transfer between the carried microorganisms.

The tensile strengths of PA-N-rGO3, PA-N-rGO2, PA-N-rGO1, PA-N-rGO0.5, PA-N-rGO0.1 and PA-N-rGO0 are tested through mechanical properties, which are 86, 111, 231, 199, 134 and 75 Mpa respectively. With the increase of the N-rGO doping amount, the tensile strength of the PA-N-rGO fibers first increases and then decreases, which indicates that the doping of N-rGO can significantly improve the mechanical strength of the fiber material. However, the excessive N-rGO will agglomerate in the system and thus cannot be uniformly distributed in the system, which will seriously affect the mechanical properties of the material.

Embodiment 4

Preparation of P/F-$TiO_{2-n}$ Porous Membrane Electrode:

Porous Ti plates (200×200 mm, with an average pore size of 80 μm and porosity of 30%) are pre-treated by heating in potassium hydroxide and oxalic acid solutions successively, impurities are removed from the surfaces, and titanium oxide films are formed in situ on the surfaces of the porous Ti plates by an electrochemical etching method in the article "Removal of aqueous triclosan using $TiO_2$ nanotube arrays reactive membrane by sequential adsorption and electrochemical degradation"; The specific method is as follows: an electrochemical etching solution (the mass fraction of glycol is 94.7%, the mass fraction of ultrapure water is 5%, and the mass fraction of ammonium fluoride is 0.3%) is prepared, the pre-treated porous Ti plates are used as anodes and placed in the middle of an electrochemical reactor, two pure Ti plates are used as cathodes and placed on both sides of the porous Ti plates, the electrodes are spaced 40 mm apart and operate at a constant voltage of 40 V, the etching time is 8 h, after the reaction, the porous Ti plates are removed, rinsed with deionized water, dried at ambient temperature and calcined in a muffle furnace at 450° C. for 2 h, the heating rate is 5° C./min, and $TiO_{2-n}$ porous membrane electrodes are obtained by natural cooling.

Then, the $TiO_{2-n}$ porous membrane electrodes are put into a 1 mol/L potassium fluoride aqueous solution for repeated dip-coating (for 10 times), and a fluorinated precursor material is loaded on the electrode surfaces. The $TiO_{2-n}$ porous membrane electrodes are put into a corundum porcelain boat and then into a tube furnace, the porcelain boat with sodium hypophosphite (2 g) is placed at a distance of 100 mm from the $TiO_{2-n}$ porous membrane electrodes upwind of the tube furnace, gradient heating is carried out in a nitrogen atmosphere at a heating rate of 5° C./min, isothermal reactions are conducted for 1 h respectively at temperatures of 350° C. and 450° C., natural cooling is carried out to room temperature, and finally, electrochemical reduction treatment is performed on the $TiO_{2-n}$ porous membrane electrodes, thus obtaining the P/F co-doped titanium suboxide (P2/F1-$TiO_{2-n}$) porous membrane electrode material.

Reference group: the concentration of the potassium fluoride aqueous solution is fixed to 1 mol/L by the same preparation method, the usage amount of sodium hypophosphite is 0.5, 1, 3 and 5 g respectively, and the porous membrane electrodes are numbered P0.5/F1-$TiO_{2-n}$, P1/F1-$TiO_{2-n}$, P3/F1-$TiO_{2-n}$ and P5/F1-$TiO_{2-n}$ respectively. The usage amount of sodium hypophosphite is fixed to 2 g, the concentration of the potassium fluoride aqueous solution is 0.5, 2 and 3 mol/L respectively, and the porous membrane electrodes are numbered P2/F0.5-$TiO_{2-n}$, P2/F2-$TiO_{2-n}$ and P2/F3-$TiO_{2-n}$ respectively.

Performance Test of P/F-$TiO_{2-n}$ Porous Membrane Electrode:

Tests of water contact angles: $TiO_{2-n}$, P2/F0.5-$TiO_{2-n}$, P2/F1-$TiO_{2-n}$, P2/F2-$TiO_{2-n}$ and P2/F3-$TiO_{2-n}$ series materials are tested, and the results show that the water contact angles of the materials are gradually increased (47°, 93°, 109°, 140° and) 162° with the increase of the concentration of the potassium fluoride aqueous solution, and the hydrophobicity is significantly enhanced with the increase of the F doping amount. The water contact angles of P0.5/F1-$TiO_{2-n}$, P1/F1-$TiO_{2-n}$, P2/F1-$TiO_{2-n}$, P3/F1-$TiO_{2-n}$ and P5/F1-$TiO_{2-n}$ series materials are 115°, 112°, 109°, 101° and 99° respectively, and the P doping amount has no obvious influence on the hydrophobicity of the materials.

The resistances of $TiO_{2-n}$, P2/F0.5-$TiO_{2-n}$, P2/F1-$TiO_{2-n}$, P2/F2-$TiO_{2-n}$ and P2/F3-$TiO_{2-n}$ are tested by a four-probe method, which are 21, 2.4, 1.7, 2.1 and 1.9$\Omega$ respectively. The influence of the F doping amount on the electrical conductivity is not obvious. The resistances of P0.5/F1-$TiO_{2-n}$, P1/F1-$TiO_{2-n}$, P2/F1-$TiO_{2-n}$, P3/F1-$TiO_{2-n}$ and P5/F1-$TiO_{2-n}$ series materials are 6.4, 4.5, 1.7, 1.1 and 0.8$\Omega$ respectively, and with the increase of the P doping amount, the electrical conductivity of the materials is also enhanced, indicating that P doping can effectively change the electronic structure of the system and regulate the localized electron configuration at the active reaction site, and new electron migration channels are constructed, which is conducive to improving the catalytic stability and catalytic activity of the active site.

Electrocatalytic Degradation Performance

With a mixed aqueous solution of an antibiotic (10 mg/L ciprofloxacin), an anticancer drug (10 mg/L capecitabine) and a non-steroidal anti-inflammatory drug (10 mg/L ibuprofen) as simulated pharmaceutical wastewater, the P2/F0.5-TiO$_{2-n}$, P2/F2-TiO$_{2-n}$, P1/F1-TiO$_{2-n}$, P2/F1-TiO$_{2-n}$, P3/F1-TiO$_{2-n}$ and TiO$_{2-n}$ (reference group) porous membrane electrodes prepared in embodiment 5 as anodes and 4-mesh stainless steel meshes as cathodes and with the electrode spacing of 15 mm, flow-through electrochemical degradation modules are constructed respectively to treat the above simulated pharmaceutical wastewater and operate at a constant current (3 mA/cm$^2$), the wastewater is operated in a flow-through mode, the reaction time is 60 min, the reaction liquid is extracted every 10 min, the extracted reaction liquid is filtered with a 0.22-μm filter membrane, then 1 mL is extracted, and the degradation rate is tested by a high performance liquid chromatograph.

The results of high performance liquid phase tests show that the degradation rates of the above three typical drugs on TiO$_{2-n}$ anodes are only 55%, 28% and 22% after reaction for 60 min, while the degradation rates of the P/F-TiO$_{2-n}$ series porous membrane electrodes are all higher than that of TiO$_{2-n}$ (reference group). P2/F1-TiO$_{2-n}$ has appropriate hydrophobicity and active reaction sites, which can effectively react with hydrophilic and hydrophobic drugs in the water, so that the degradation rates of three target pollutants are all higher than 99% after the mixed wastewater reacts for 40 min. In contrast, the F doping amount that is too high (P2/F2-TiO$_{2-n}$) or too low (P2/F0.5-TiO$_{2-n}$) can only effectively degrade the hydrophobic drug (the degradation rate of capecitabine and ibuprofen reaches 99% after reaction for 40 min) or hydrophilic drug (the degradation rate of ciprofloxacin reaches 99% after reaction for 40 min), and cannot effectively degrade the two target pollutants at the same time. In addition, when the P doping amount is too low (P1/F1-TiO$_{2-n}$), the membrane electrode material has low degradation performance for the target pollutants due to the lack of sufficient active reaction sites on the surface (the degradation rates of the three target pollutants only reach 75% after reaction for 60 min); and when the P doping amount is too high (P3/F1-TiO$_{2-n}$), excessive P destroys the lattice structure of TiO$_{2-n}$, and the content of the active site Ti$^{3+}$ is much lower than that of other materials (P2/F0.5-TiO$_{2-n}$, P2/F2-TiO$_{2-n}$, P1/F1-TiO$_{2-n}$ and P2/F1-TiO$_{2-n}$) in the series, causing that the degradation rates of the three target pollutants are only about 60% after reaction for 60 min. Therefore, only with appropriate F/P doping amounts and doping methods, the hydrophilicity of the electrode surfaces can be effectively regulated, and effective electron migration channels and active reaction sites can be constructed, which maintains the catalytic activity and improves the catalytic stability at the same time.

Embodiment 5

Comparison Test of Microbial Load:

With PA-N-rGO3, PA-N-rGO2, PA-N-rGO1, PA-N-rGO0.5, PA-N-rGO0.1 and PA-N-rGO0 (reference group) fixed fiber curtains as microbial carriers, a multistage flow-through composite electrochemical-biological submerged fixed film reactor is constructed (the biological submerged fixed film reactor is divided into three cells by a two-stage flow-through electrochemical degradation module), and the anodes used for the flow-through electrochemical degradation module are made of P2/F1-TiO$_{2-n}$ with optimal testing performance in embodiment 5. A constant current (3 mA/cm$^2$) is applied for operation, activated sludge is added for culture, and the surface of the fiber carrier can carry a large number of microorganisms in five days. In the case of the same operation conditions and culture time, the microbial load on the fixed fiber curtain carrier containing N-rGO is higher than that on the reference group without N-rGO, wherein the microbial load on the PA-N-rGO1 fiber curtain carrier with the largest specific surface area and the best electrical conductivity is the highest in this series of materials and is 3.5 times that of the reference group (PA-N-rGO0), and the abundance of acid-producing microorganisms in floras is increased by 1.5 times compared with the control group. In addition, the microbial load of the PA-N-rGO1 fiber curtain carrier is more than 5.7 times that of the traditional packings (polypropylene stereo elastic packing and polyethylene porous suspension ball packing).

The microbial load, effluent COD and ammonia nitrogen performance of the multistage flow-through composite electrochemical-biological submerged fixed film reactor constructed from PA-N-rGO1 and P2/F1-TiO$_{2-n}$ are compared under power-on and power-off conditions, and in the case that the other operation conditions are the same as those of the above biological submerged fixed film reactor, the microbial load, effluent COD and ammonia nitrogen content of the fiber carrier under power-on conditions are 1.4 times, ⅓ and ½ of those under power-off conditions respectively.

Embodiment 6

Degradation Test of Actual Pharmaceutical Wastewater Test:

The actual pharmaceutical wastewater is taken as the target water body, the influent quality is COD 3000 mg/l, BOD 600-1000 mg/l, TN 200-300 mg/l and NH$_3$-N 150-250 mg/l, and the multistage flow-through composite electrochemical-biological submerged fixed film reactor constructed in embodiment 6 is used to operate at a constant current (3 mA/cm$^2$). After stable operation, effluent water is taken out to test the water quality, and the test results show that COD≤50 mg/l, BOD≤5 mg/l and TN≤10 mg/l. The traditional anaerobic-aerobic-MBR process is selected as the reference group to treat the above actual pharmaceutical wastewater. After stable operation, effluent water is taken out to test the water quality, and the test results show that COD 150-200 mg/l, BOD≤10 mg/l and TN is about 60 mg/l. The comparison results show that the treatment capacity of the multistage flow-through composite electrochemical-biological submerged fixed film reactor of the present patent for the actual pharmaceutical wastewater is much better than that of the traditional microbial treatment process. Moreover, in the case that the operation time is the same, the excess activated sludge produced by the multistage flow-through composite electrochemical-biological submerged fixed film reactor is about ¹⁄₁₀ of that of the traditional microbial treatment process, indicating that the multistage flow-through composite electrochemical-biological submerged fixed film reactor constructed by the present patent provides a suitable growing environment for protozoa, metazoa and aquatic animals through the special carrier packing, the specific distribution pattern and the strengthening effect of the electrochemical degradation module to form a stable food chain system, which can make the excessive zoogloea (activated sludge) produced in the system gradually convert into $CO_2$ and $H_2O$ through the multistage predation process by using the metabolism of different organisms, thereby improving the carbon conversion rate (from organic C to $CO_2$) and the sludge reduction effect. The whole process achieves the balance transfer of C sources with the conversion of energy and finally maintains the conservation of matter.

Embodiment 7

Degradation Test of Actual Chemical Wastewater Test:

The actual chemical wastewater is taken as the target water body, the influent quality is COD 3000 mg/l, BOD 1000-1200 mg/l and formaldehyde ($CH_2O$) 300 mg/l, and the multistage flow-through composite electrochemical-biological submerged fixed film reactor constructed in embodiment 6 is used to operate at a constant current (3 mA/cm$^2$). After stable operation, effluent water is taken out to test the water quality, and the test results show that COD≤50 mg/l, BOD≤5 mg/l and $CH_2O$≤0.5 mg/l. The traditional UASB-MBBR process is selected as the reference group to treat the above actual chemical wastewater. After stable operation, effluent water is taken out to test the water quality, and the test results show that COD≥150 mg/l, BOD≥20 mg/l and $CH_2O$≤15 mg/l. Since the actual chemical wastewater contains more toxic $CH_2O$, the microorganisms are poisoned by $CH_2O$ and thus has low load of shock resistance, which leads to unstable operation of the traditional process. The multistage flow-through composite electrochemical-biological submerged fixed film reactor constructed by the present patent has simple operation conditions of the process, the microbial load of the surface of the fiber carrier is much higher than that of the traditional microbial carrier, the electrochemical degradation module can also carry out electrooxidation step by step, strengthen the degradation and detoxification of toxic organics and improve the biodegradability of the wastewater so that the system has high resistance to $CH_2O$ shock and toxicity and operates stably, the yield of excess activated sludge is more than 90% less than that of the traditional microbial treatment process, the effluent quality is also improved, and the discharge quality of the effluent water meets the first class A discharge standard in *Discharge Standard of Pollutants for Municipal Wastewater Treatment Plant* (GB/T18918-2002), which also indicates that the multistage flow-through composite electrochemical-biological submerged fixed film reactor can be suitable for treatment of chemical wastewater with high biotoxicity.

Embodiment 8

Degradation Test of Actual Municipal Wastewater Test:

The actual municipal wastewater is taken as the target water body, the influent quality is COD 400 mg/l and $NH_3$-N 35 mg/l, and the multistage flow-through composite electrochemical-biological submerged fixed film reactor constructed in embodiment 6 is used to operate at a constant current (3 mA/cm$^2$). After stable operation, effluent water is taken out to test the water quality, and the test results show that COD≤30 mg/l and $NH_3$-N≤5 mg/l. The traditional MBR process is selected as the reference group to treat the above actual chemical wastewater. After stable operation, effluent water is taken out to test the water quality, and the test results show that COD≥50 mg/l and $NH_3$-N≥15 mg/l. The yield of excess activated sludge of the multistage flow-through composite electrochemical-biological submerged fixed film reactor is only 5% of that of the traditional MBR process, which indicates that the system is also suitable for treatment of municipal wastewater with low COD.

The invention claimed is:

1. A method for constructing a multistage food chain biofilm system enhanced by electrochemistry, comprising the following steps:
    step 1: preparing a nylon 66 (PA66) material;
    step 2: preparing an N-doped reduced graphene oxide (N-rGO) material;
    step 3: treating the N-rGO material obtained in step 2 by ball milling, taking out the N-rGO material for ultrasonic dispersion with deionized water, conducting suction filtration of the dispersion liquid, taking out black filtrate, and carrying out freeze drying to obtain a few-layer N-rGO nanosheet material; and heating the PA66 material obtained in step 1, adding the few-layer N-rGO nanosheet material in a molten state, conducting stirring in the molten state, forming PA-N-rGO fibers by an extruder, and fixing both ends of the PA-N-rGO fibers on a frame composed of polypropylene pipes by a textile machine to form a plurality of fixed fiber curtains composed of the PA-N-rGO fibers to be used as fixed fiber curtain carriers for carrying microorganisms;
    step 4: pre-treating porous Ti plates by heating in potassium hydroxide and oxalic acid solutions successively, removing impurities from the surfaces, and forming titanium oxide films in situ on the surfaces of the porous Ti plates; then, conducting repeated dip-coating on the oxidized porous Ti plates in a 0.5-3 mol/L potassium fluoride aqueous solution, and loading potassium fluoride on the surfaces of the Ti plates; and putting the Ti plates into a corundum porcelain boat and then into a tube furnace, placing the porcelain boat with sodium hypophosphite at a distance of 100 mm from the porous Ti plates upwind of the tube furnace, conducting isothermal reactions for 1-2 h at temperatures of 350° C. in a nitrogen atmosphere, then heating up to 450° C. in the nitrogen atmosphere and conducting isothermal reaction for 1-2 h, carrying out natural cooling to room temperature, and finally performing electrochemical reduction treatment of the porous Ti plates, thus obtaining a P/F co-doped titanium suboxide porous membrane electrode material;
    step 5: constructing flow-through electrochemical degradation modules with anodes made of the obtained P/F co-doped titanium suboxide porous membrane electrode material and cathodes made of 4-30-mesh stainless steel meshes, wherein the cathodes and the anodes are spaced 10-30 mm apart; putting the fixed fiber curtain carriers obtained in step 3 into a microbial reactor, with the fixed fiber curtains spaced 200-500 mm apart, so as to form a biological submerged fixed film reactor; and dividing the biological submerged fixed film reactor into 3-12 cells by the flow-through electrochemical degradation modules to construct a multistage flow-through composite electrochemical-biological submerged fixed film reactor, applying a constant current of 0.5-5 mA/cm$^2$ for operation, and adding activated sludge to the microbial reactor for culture, which enables fiber surfaces to carry a large number of functional microorganisms in a short time.

2. The method for constructing a multistage food chain biofilm system enhanced by electrochemistry according to claim 1, wherein in step 3, the N-rGO material is treated by dry ball milling at a revolving speed of 3000-5000 rpm for 30-60 min.

3. The method for constructing a multistage food chain biofilm system enhanced by electrochemistry according to claim 1, wherein in step 3, the PA66 material is heated to 230-280° C. and added with the few-layer N-rGO nanosheet material in a molten state at a mass ratio of 7:3-99:1, which are stirred in the molten state for 30 min.

4. The method for constructing a multistage food chain biofilm system enhanced by electrochemistry according to claim 1, wherein in step 3, the length range of the PA-N-rGO fibers is 50-2000 mm.

5. The method for constructing a multistage food chain biofilm system enhanced by electrochemistry according to claim 1, wherein in step 4, the number of times of dip-coating is 3-20.

6. The method for constructing a multistage food chain biofilm system enhanced by electrochemistry according to claim 1, wherein in step 4, a heating rate is 5° C./min.

* * * * *